United States Patent
Li et al.

(10) Patent No.: US 12,549,370 B2
(45) Date of Patent: Feb. 10, 2026

(54) METHOD AND APPARATUS FOR DECENTRALIZED PRIVACY PRESERVING AUDIT BASED ON ZERO KNOWLEDGE PROOF PROTOCOL

(71) Applicant: PwC Product Sales LLC, New York, NY (US)

(72) Inventors: Chung-Sheng Li, Scarsdale, NY (US); Winnie Cheng, West New York, NJ (US); Mark John Flavell, Madison, NJ (US); Nicholas John Hamer, Tampa, FL (US); Rhodri Davies, Tampa, FL (US); Elizabeth Cornelia Botha, Western Cape (ZA); Henry Hwangbo, Northbrook, IL (US); Scott Likens, Austin, TX (US)

(73) Assignee: PwC Product Sales LLC, New York, NY (US)

( * ) Notice: Subject to any disclaimer, the term of this patent is extended or adjusted under 35 U.S.C. 154(b) by 308 days.

(21) Appl. No.: 18/181,273

(22) Filed: Mar. 9, 2023

(65) Prior Publication Data

US 2024/0305461 A1    Sep. 12, 2024

(51) Int. Cl.
  *H04L 9/32* (2006.01)
  *H04L 9/08* (2006.01)
  *H04L 9/40* (2022.01)

(52) U.S. Cl.
  CPC .......... *H04L 9/3221* (2013.01); *H04L 9/083* (2013.01); *H04L 63/0428* (2013.01)

(58) Field of Classification Search
  CPC ... H04L 63/0428; H04L 9/083; H04L 9/3239; H04L 9/50; H04L 9/3221

(Continued)

(56) References Cited

U.S. PATENT DOCUMENTS 10,628,833 B2 *  4/2020  Hines .................... G06F 21/602
11,146,399 B2 * 10/2021  Westland ............. H04L 9/0637
(Continued)

FOREIGN PATENT DOCUMENTS

WO        2023/279039 A1    1/2023

OTHER PUBLICATIONS

Auditchain. (2021) "Decentralized Continuous Audit & Reporting Protocol Ecosystem," Auditchain Core Contracts V1, located at https://www.auditchain.finance/whitepaper-v1.pdf; 10 pages.

(Continued)

*Primary Examiner* — Amare F Tabor
(74) *Attorney, Agent, or Firm* — Morrison & Foerster LLP (57) ABSTRACT

Provided herein are systems and methods for decentralized privacy preserving audits comprising receiving by a first local system, from an orchestrator system, instructions to perform a local audit; executing, by the first local system, in response to receiving the instructions to perform the local audit, a first local audit model epoch, wherein executing the first local audit model epoch comprises: analyzing information from one or more data sources from a local data set; receiving first input information from a second local system through a privacy preserving communication framework in response to requesting the first input information; determining whether information from the one or more data sources from the local data set is reconciled based on the first input information; and in accordance with a determination that the information from the one or more data sources from the local data set is not reconciled, executing a second local audit model epoch.

27 Claims, 4 Drawing Sheets

(58) Field of Classification Search
USPC .......................................................... 713/159
See application file for complete search history.

(56) References Cited

U.S. PATENT DOCUMENTS

| | | | |
|---|---|---|---|
| 11,238,390 B2* | 2/2022 | Brannon | G06F 21/6245 |
| 11,301,590 B2* | 4/2022 | Camenisch | G06F 21/64 |
| 11,356,456 B2* | 6/2022 | Turgeman | H04L 63/102 |
| 11,521,276 B2* | 12/2022 | Kraemer | H04L 9/3218 |
| 11,687,878 B2* | 6/2023 | Becher | H04L 9/3239 |
| | | | 705/29 |
| 2005/0015344 A1* | 1/2005 | Athens | G07B 17/00362 |
| | | | 705/67 |
| 2018/0365616 A1* | 12/2018 | Taylor | G06Q 10/087 |
| 2021/0314328 A1 | 10/2021 | Simons | |
| 2023/0004590 A1 | 1/2023 | Li et al. | |
| 2023/0004604 A1 | 1/2023 | Li et al. | |
| 2023/0004845 A1 | 1/2023 | Li et al. | |
| 2023/0004888 A1 | 1/2023 | Li et al. | |
| 2023/0005075 A1 | 1/2023 | Li et al. | |
| 2023/0315904 A1* | 10/2023 | Lemieux | H04L 9/3218 |
| | | | 705/3 |
| 2024/0330323 A1 | 10/2024 | Li et al. | |
| 2024/0331056 A1 | 10/2024 | Li et al. | |
| 2024/0346418 A1 | 10/2024 | Li et al. | |
| 2025/0182217 A1 | 6/2025 | Li et al. | |
| 2025/0209092 A1 | 6/2025 | Li et al. | |

OTHER PUBLICATIONS

Auditchain. (2022) "Process Control NFTs," located at https://docs/auditchain.finance/auditchain-protocol/auditchain-core-v1/process-control-nft, visited on Dec. 21, 2022 (5 pages).

Ayala. (Dec. 2022) "What is zkledger?," located at https://academy.bit2me.com/en/que-es-zkledger/, visited on Dec. 21, 2022. (10 pages).

Chailloux et al. (Dec. 2007). "Interactive and Noninteractive Zero Knowledge are Equivalent in the Help Model," International Association for Cryptologic Research 2007(467). 40 pages.

Ethereum.org. (Dec. 2022). "What are zero-knowledge proofs?," located at https://ethereum.org/en/zero-knowledge-proofs/, visited on Dec. 21, 2022. (15 pages).

EthHub. (2022) "ZK-STARKs," located at https://web.archive.org/web/20221207014423/https://docs.ethhub.io/ethereum-roadmap/layer-2-scaling/zk-starks/; 3 pages.

Ganesan. (Mar. 2019) "How to extract keywords from text with TF-IDF and Python's Scikit-Learn," located at https://www.freecodecamp.org/news/how-to-extract-keywords-from-text-with-tf-idf-and-pythons-scikit-learn-b2a0f3d7e667/, visited on Dec. 21, 2022. (13 pages).

J. Singh. (2022) "zk-STARKs vs. zk-SNARKs explained," located at https://cointelegraph.com/explained/zk-starks-vs-zk-snarks-explained, visited on Dec. 21, 2022. (6 pages).

Narula et al. "zkLedger: Privacy-Preserving Auditing for Distributed Ledgers," Proceedings of the 15th USENIX Symposium on Networked Systems Design and Implementation (NDSI '18), Apr. 9-11, 2018, Renton, Washington, USA; pp. 65-80.

Ragnar. (2020) "Keywords Extraction Using TF-IDF Method," located at https://www.kaggle.com/code/rowhitswami/keywords-extraction-using-tf-idf-method, visited on Dec. 21, 2022. (11 pages).

Sanders. (Dec. 2020) "What is TF-IDF and How To Use It: Advanced On-Page Optimization," located at https://www.semrush.com/blog/tf-idf-advanced-on-page-optimization/, visited on Dec. 21, 2022. (13 pages).

Segura. (Aug. 2022) "What are zk-STARKs?," located at https://academy.bit2me.com/en/what-are-zk-stark/, visited on Dec. 21, 2022. (10 pages).

Simha. (Oct. 2021) "Understanding TF-IDF for Machine Learning," located at https://www.capitalone.com/tech/machine-learning/understanding-tf-idf/, visited on Dec. 21, 2022. (9 pages).

Wikipedia. (2022) "Differential privacy," located at https://en.wikipedia.org/wiki/Differential_privacy, visited on Dec. 21, 2022. (12 pages).

Wikipedia. (2022) "Non-interactive zero-knowledge proof," located at https://en.wikipedia.org/wiki/Non-interacitve_zero-knowledge_proof, visited on Dec. 21, 2022. (4 pages).

Wikipedia. (2022) "Schnorr signature," located at https://en.wikipedia.org/wiki/Schnorr_signature, visited on Dec. 21, 2022. (4 pages).

Wikipedia. (2022) "Zero-knowledge proof," located at https://en.wikipedia.org/wiki/Zero-knowledge_proof, visited on Dec. 21, 2022. (17 pages).

International Search Report and Written Opinion mailed Jun. 26, 2023, directed to International Application No. PCT/US2023/064013; 11 pages.

* cited by examiner

METHOD AND APPARATUS FOR DECENTRALIZED PRIVACY PRESERVING AUDIT BASED ON ZERO KNOWLEDGE PROOF PROTOCOL

FIELD

The present disclosure relates generally to decentralized audits, and more specifically to methods and systems for conducting synchronous and asynchronous decentralized privacy preserving audits.

BACKGROUND

Data sharing across geographic locations, multiple different organizations, and/or multiple departments within the same organization is often complicated by restrictions based in ethical or legal obligations to maintain confidentiality. Such restrictions may affect the accuracy of various processes, for example, auditing, where it may be more difficult to verify assertions made in various data (e.g., financial statements) by counterparties without breaching some duty of confidentiality owed to either party by the auditor.

SUMMARY

There is a need for systems and methods for maintaining confidentiality while providing accurate and comprehensive auditing services. The purpose of an audit is to review and evaluate the accuracy of data (e.g., income data, expense data, accounts receivable data, etc.) contained in financial statements. However, in some instances the audit client may impose restrictions on which data are visible to an external auditor. Further, existing audit methodologies often require implementation of virtual barriers to block the sharing of information between engagement teams within the same audit firm (e.g., an ethical wall). For example, data sharing may be barred by an ethical wall where engagement teams are working with clients that are counterparties to a business relationship (e.g., vendor-client relationship, lessor-lessee relationship, mortgagor-mortgagee relationship) thus preventing the sharing of risk information between the parties. Additional or different restrictions on information sharing between engagement teams may also be present, including data residency requirements, data sovereignty requirements, and data localization requirements which may prevent data from being shared across borders. These restrictions often render the task of performing a comprehensive review of financial data more difficult and inherently reduce the accuracy of an audit by limiting the information available to auditors.

Thus, existing systems and methods for performing audit services could be improved by providing an effective mechanism for sharing data while maintaining the confidentiality of the parties involved. Disclosed herein are exemplary devices, apparatuses, systems, methods and non-transitory storage media for performing decentralized privacy preserving audits, wherein performing decentralized audits includes performing a plurality of local system level audits that form part of an overall decentralized auditing system. The systems and methods provided herein include an orchestrator system and one or more local systems. The orchestrator system may be a central computing system responsible for developing the audit strategy, initiating the audit, and communicating the strategy and initiation of an audit to the local systems. The local systems may be local computing systems associated with audit teams (e.g., different audit teams each working with an engagement client), engagement clients (e.g., different businesses, etc.), banks, or other parties integral to the auditing process. The one or more local systems are frequently represented as a single local system throughout this description, but it should be understood that the systems and methods described may include a plurality of local systems.

In some examples, the orchestrator system may initiate an audit by sending out instructions to perform the audit to one or more of the local systems (e.g., to a distinct local system associated with each of the audit teams). The instructions may include audit assertions, which instruct the local systems to query/verify the existence, completeness, accuracy, classification, or disclosure of an account or other financial data. To do this, a local system needs to communicate with, for instance, other local systems associated with audit teams engaged with different engagement clients to request data that can be used verify transaction or other financial data held by the requesting local system. Data held by each of the respective local systems is shared using a framework designed to preserve the parties' privacy (e.g., zkLedger or another privacy preserving communication framework/protocol). After determining whether all necessary information received from the one or more other local systems is reconciled against data held by the requesting local system, the requesting local system may communicate to the orchestrator system that the respective local audit is complete.

Accordingly, disclosed herein are systems and methods for performing comprehensive decentralized privacy preserving audits by allowing for communication between parties where communication may otherwise be barred by ethical restrictions, data residency restrictions, data sovereignty restrictions, data localization restrictions, or other barriers. Thus, systems and methods are provided that can enhance auditing processes by, for example, providing a mechanism for more complete data sharing and thus more accurate review and reconciliation of financial data during an audit.

An exemplary system is provided for performing a decentralized privacy preserving audit, the system comprising a local system communicatively coupled to an orchestrator system, one or more processors, and a memory storing one or more programs, the one or more programs configured to be executed by the one or more processors and including instructions that when executed by the one or more processors cause the system to: receive by the first local system, from the orchestrator system, instructions to perform a local audit; execute, by the first local system, in response to receiving the instructions to perform a local audit, a first local audit model epoch, wherein executing the first local audit model epoch comprises: analyzing information from one or more data sources from a local data set; receiving first input information from a second local system through a privacy preserving communication framework in response to requesting the first input information; determining whether information from the one or more data sources from the local data set is reconciled based on the first input information; and in accordance with a determination that the information from the one or more data sources from the local data set is not reconciled, executing a second local audit model epoch.

In some examples of the system, executing the first local audit model epoch comprises, in accordance with a determination that the information from the one or more data sources from the local data set is reconciled, generating a reconciliation status and transmitting the reconciliation status to the orchestrator system, wherein the reconciliation status indicates that the information from the one or more data sources from the local data set is reconciled.

In some examples of the system, executing the second local audit model epoch comprises: requesting, by the first local system, second input information from the second local system through a privacy preserving communication framework.

In some examples of the system, executing the second local audit model epoch comprises: in accordance with a determination that the second input information can be transmitted through the privacy preserving communication framework without compromising the privacy of the second local system, transmitting the second input information through the privacy preserving communication framework.

In some examples of the system, executing the second local audit model epoch comprises: in accordance with a determination that the second input information cannot be transmitted through the privacy preserving communication framework without compromising the privacy of the second local system, not transmitting the second input information through the privacy preserving communication framework.

In some examples of the system, the orchestrator system is configured to, upon receiving the transmitted reconciliation status, generate an audit report.

In some examples of the system, the instructions to perform the local audit include identifying information associated with the first local system and second local system.

In some examples of the system, the instructions to perform the local audit instruct the first local system to share metadata with the second local system.

In some examples of the system, the instructions to perform the local audit comprise one or more audit assertions provided by the orchestrator system.

In some examples of the system, the first local system and second local system are communicatively coupled to the orchestrator system using the privacy preserving communication framework.

In some examples of the system, the first local system and second local system form a subset of a plurality of local systems and wherein each of the plurality of local systems are communicatively coupled to each of the other local systems in the plurality of local systems.

In some examples of the system, each of the plurality of local systems are communicatively coupled to the orchestrator system using the privacy preserving communication framework.

In some examples of the system, each of the plurality of local systems are communicatively coupled to each of the other local systems in the plurality of local systems using the privacy preserving communication framework.

In some examples of the system, the privacy preserving communication framework comprises a ledger.

In some examples of the system, the privacy preserving communication framework comprises one or more zero-knowledge proof protocols.

In some examples of the system, one or more of the one or more zero-knowledge proof protocols is an interactive zero-knowledge proof protocol.

In some examples of the system, one or more of the one or more zero-knowledge proof protocols is a non-interactive zero-knowledge proof protocol.

In some examples of the system, the privacy preserving communication framework comprises a plurality of privacy preserving communication modules, wherein a privacy preserving communication module communicatively couples the first local system to the orchestrator system.

In some examples of the system, the instructions to perform the local audit comprise a time constraint, and wherein the information from the one or more data sources from the local data set is limited by the time constraint.

In some examples of the system, wherein the time constraint comprises a time interval.

In some examples of the system, the first local system comprises one or more trained machine learning models.

In some examples of the system, the first local system comprises one or more interfaces, the one or more interfaces being configured to allow one or more auditors to input rules for performing the local audit.

In some examples of the system, executing a local audit model epoch further comprises: distributing a token to one or the one or more auditors when a rule input by the respective auditor is used to perform the local audit.

In some examples of the system, executing the first local audit model epoch further comprises: generating by the first local system, an audit report.

An exemplary method comprises: receiving by a first local system, from an orchestrator system, instructions to perform a local audit; executing, by the first local system, in response to receiving the instructions to perform the local audit, a first local audit model epoch, wherein executing the first local audit model epoch comprises: analyzing information from one or more data sources from a local data set; receiving first input information from a second local system through a privacy preserving communication framework in response to requesting the first input information; determining whether information from the one or more data sources from the local data set is reconciled based on the first input information; and in accordance with a determination that the information from the one or more data sources from the local data set is not reconciled, executing a second local audit model epoch.

In some examples of the method, executing the first local audit model epoch further comprises: in accordance with a determination that the information from the one or more data sources from the local data set is reconciled, generating a reconciliation status and transmitting the reconciliation status to the orchestrator system, wherein the reconciliation status indicates that the information from the one or more data sources from the local data set is reconciled.

In some examples of the method, executing the second local audit model epoch comprises: requesting, by the first local system, second input information from the second local system through a privacy preserving communication framework.

In some examples of the method, executing the second local audit model epoch comprises: in accordance with a determination that the second input information can be transmitted through the privacy preserving communication framework without compromising the privacy of the second local system, transmitting the second input information through the privacy preserving communication framework.

In some examples of the method, executing the second local audit model epoch comprises: in accordance with a determination that the second input information cannot be transmitted through the privacy preserving communication framework without compromising the privacy of the second local system, not transmitting the second input information through the privacy preserving communication framework.

In some examples of the method, the orchestrator system is configured to, upon receiving the transmitted reconciliation status, generate an audit report.

In some examples of the method, the instructions to perform the local audit include identifying information associated with the first local system and second local system.

In some examples of the method, the instructions to perform the local audit instruct the first local system to share metadata with the second local system.

In some examples of the method, the instructions to perform the local audit comprise one or more audit assertions provided by the orchestrator system.

In some examples of the method, the first local system and second local system are communicatively coupled to the orchestrator system using the privacy preserving communication framework.

In some examples of the method, the first local system and second local system form a subset of a plurality of local systems and wherein each of the plurality of local systems are communicatively coupled to each of the other local systems in the plurality of local systems.

In some examples of the method, each of the plurality of local systems are communicatively coupled to the orchestrator system using the privacy preserving communication framework.

In some examples of the method, each of the plurality of local systems are communicatively coupled to each of the other local systems in the plurality of local systems using the privacy preserving communication framework.

In some examples of the method, the privacy preserving communication framework comprises a ledger.

In some examples of the method, the privacy preserving communication framework comprises one or more zero-knowledge proof protocols.

In some examples of the method, one or more of the one or more zero-knowledge proof protocols is an interactive zero-knowledge proof protocol.

In some examples of the method, one or more of the one or more zero-knowledge proof protocols is a non-interactive zero-knowledge proof protocol.

In some examples of the method, the privacy preserving communication framework comprises a plurality of privacy preserving communication modules, wherein a privacy preserving communication module communicatively couples the first local system to the orchestrator system.

In some examples of the method, the instructions to perform the local audit comprise a time constraint, and wherein the information from the one or more data sources from the local data set is limited by the time constraint.

In some examples of the method, wherein the time constraint comprises a time interval.

In some examples of the method, the first local system comprises one or more trained machine learning models.

In some examples of the method, the first local system comprises one or more interfaces, the one or more interfaces being configured to allow one or more auditors to input rules for performing the local audit.

In some examples of the method, executing a local audit model epoch further comprises: distributing a token to one or the one or more auditors when a rule input by the respective auditor is used to perform the local audit.

In some examples of the method, executing the first local audit model epoch further comprises: generating by the first local system, an audit report.

An exemplary non-transitory computer readable storage medium stores one or more programs, the one or more programs comprising instructions, which when executed by one or more processors of an electronic device, cause the electronic device to: receive by a first local system, from an orchestrator system, instructions to perform a local audit; execute, by the first local system, in response to receiving the instructions to perform the local audit, a first local audit model epoch, wherein executing the first local audit model epoch comprises: analyzing information from one or more data sources from a local data set; receiving first input information from a second local system through a privacy preserving communication framework in response to requesting the first input information; determining whether information from the one or more data sources from the local data set is reconciled based on the first input information; and in accordance with a determination that the information from the one or more data sources from the local data set is not reconciled, executing a second local audit model epoch.

In some examples of the non-transitory computer readable storage medium, executing the first local audit model epoch further comprises: in accordance with a determination that the information from the one or more data sources from the local data set is reconciled, generating a reconciliation status and transmitting the reconciliation status to the orchestrator system, wherein the reconciliation status indicates that the information from the one or more data sources from the local data set is reconciled.

In some examples of the non-transitory computer readable storage medium, executing the second local audit model epoch comprises: requesting, by the first local system, second input information from the second local system through a privacy preserving communication framework.

In some examples of the non-transitory computer readable storage medium, executing the second local audit model epoch comprises: in accordance with a determination that the second input information can be transmitted through the privacy preserving communication framework without compromising the privacy of the second local system, transmitting the second input information through the privacy preserving communication framework.

In some examples of the non-transitory computer readable storage medium, executing the second local audit model epoch comprises: in accordance with a determination that the second input information cannot be transmitted through the privacy preserving communication framework without compromising the privacy of the second local system, not transmitting the second input information through the privacy preserving communication framework.

In some examples of the non-transitory computer readable storage medium, the orchestrator system is configured to, upon receiving the transmitted reconciliation status, generate an audit report.

In some examples of the non-transitory computer readable storage medium, the instructions to perform the local audit include identifying information associated with the first local system and second local system.

In some examples of the non-transitory computer readable storage medium, the instructions to perform the local audit instruct the first local system to share metadata with the second local system.

In some examples of the non-transitory computer readable storage medium, the instructions to perform the local audit comprise one or more audit assertions provided by the orchestrator system.

In some examples of the non-transitory computer readable storage medium, the first local system and second local system are communicatively coupled to the orchestrator system using the privacy preserving communication framework.

In some examples of the non-transitory computer readable storage medium, the first local system and second local system form a subset of a plurality of local systems and wherein each of the plurality of local systems are communicatively coupled to each of the other local systems in the plurality of local systems.

In some examples of the non-transitory computer readable storage medium, each of the plurality of local systems are communicatively coupled to the orchestrator system using the privacy preserving communication framework.

In some examples of the non-transitory computer readable storage medium, each of the plurality of local systems are communicatively coupled to each of the other local systems in the plurality of local systems using the privacy preserving communication framework.

In some examples of the non-transitory computer readable storage medium, the privacy preserving communication framework comprises a ledger.

In some examples of the non-transitory computer readable storage medium, the privacy preserving communication framework comprises one or more zero-knowledge proof protocols.

In some examples of the non-transitory computer readable storage medium, one or more of the one or more zero-knowledge proof protocols is an interactive zero-knowledge proof protocol.

In some examples of the non-transitory computer readable storage medium, one or more of the one or more zero-knowledge proof protocols is a non-interactive zero-knowledge proof protocol.

In some examples of the non-transitory computer readable storage medium, the privacy preserving communication framework comprises a plurality of privacy preserving communication modules, wherein a privacy preserving communication module communicatively couples the first local system to the orchestrator system.

In some examples of the non-transitory computer readable storage medium, the instructions to perform the local audit comprise a time constraint, and wherein the information from the one or more data sources from the local data set is limited by the time constraint.

In some examples of the non-transitory computer readable storage medium, wherein the time constraint comprises a time interval.

In some examples of the non-transitory computer readable storage medium, the first local system comprises one or more trained machine learning models.

In some examples of the non-transitory computer readable storage medium, the first local system comprises one or more interfaces, the one or more interfaces being configured to allow one or more auditors to input rules for performing the local audit.

In some examples of the non-transitory computer readable storage medium, executing a local audit model epoch further comprises: distributing a token to one or the one or more auditors when a rule input by the respective auditor is used to perform the local audit.

In some examples of the non-transitory computer readable storage medium, executing the first local audit model epoch further comprises: generating by the first local system, an audit report.

DETAILED DESCRIPTION

Disclosed herein are exemplary devices, apparatuses, systems, methods and non-transitory storage media for performing local audit. The detailed description provides a description of an exemplary system for performing a decentralized audit using a privacy preserving communication framework, exemplary methods for performing a decentralized audit including one or more local audit model epochs of a decentralized audit, and an exemplary computing device which may be used in performing a decentralized audit, in accordance with some examples.

An exemplary system for performing a decentralized privacy preserving audit as set forth herein may include a local system communicatively coupled to an orchestrator system, one or more processors, and a memory storing one or more programs. The one or more programs are configured to be executed by the one or more processors and include instructions that when executed by the one or more processors cause the system to receive, by the local system, from the orchestrator system, instructions to perform a local audit. The instructions may instruct the local system to execute one or more local audit model epochs. In some examples, executing each of the local audit model epochs comprises analyzing information from one or more data sources from a local data set and receiving input information through a privacy preserving communication framework in response to requesting the input information. The privacy preserving framework may be a zero-knowledge proof protocol, k-anonymity communication protocol, differential privacy communication protocol, or other communication framework allowing for data sharing while maintaining the confidentiality of the communicating parties.

After receiving the input information through the privacy preserving framework, the local system may determine whether the information from the one or more data sources from the local data set is reconciled based on the input information. In accordance with a determination that the information from the one or more data sources from the local data set is not reconciled, the local system may execute a second local audit model epoch. In accordance with a determination that the information from the one or more data sources from the local data set is reconciled, the local system may generate a reconciliation status, wherein the reconciliation status may indicate that the information from the one or more data sources from the local data set is reconciled. Finally, the local system may transmit the reconciliation status to the orchestrator system. Upon receiving the transmitted reconciliation status by the orchestrator system, the orchestrator system can generate an audit report.

Accordingly, the systems and methods disclosed herein can provide a privacy preserving decentralized auditing framework allowing for communication between parties where communication may often be otherwise barred by ethical restrictions, data residency restrictions, data sovereignty restrictions, data localization restrictions, or other barriers. Thus, engagement teams working with engagement clients that are counterparties in a business relationship, financial transaction, or other counterparty relationship can compare data using a privacy preserving framework without violating any ethical, legal, or other restrictions. As such, systems and methods are provided herein that can enhance auditing processes by, for example, providing a mechanism for more complete data sharing and thus more accurate review and reconciliation of financial data during an audit.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown but are accorded the scope consistent with the claims.

Exemplary System for Performing Decentralized Privacy Preserving Audit

Figure 1:
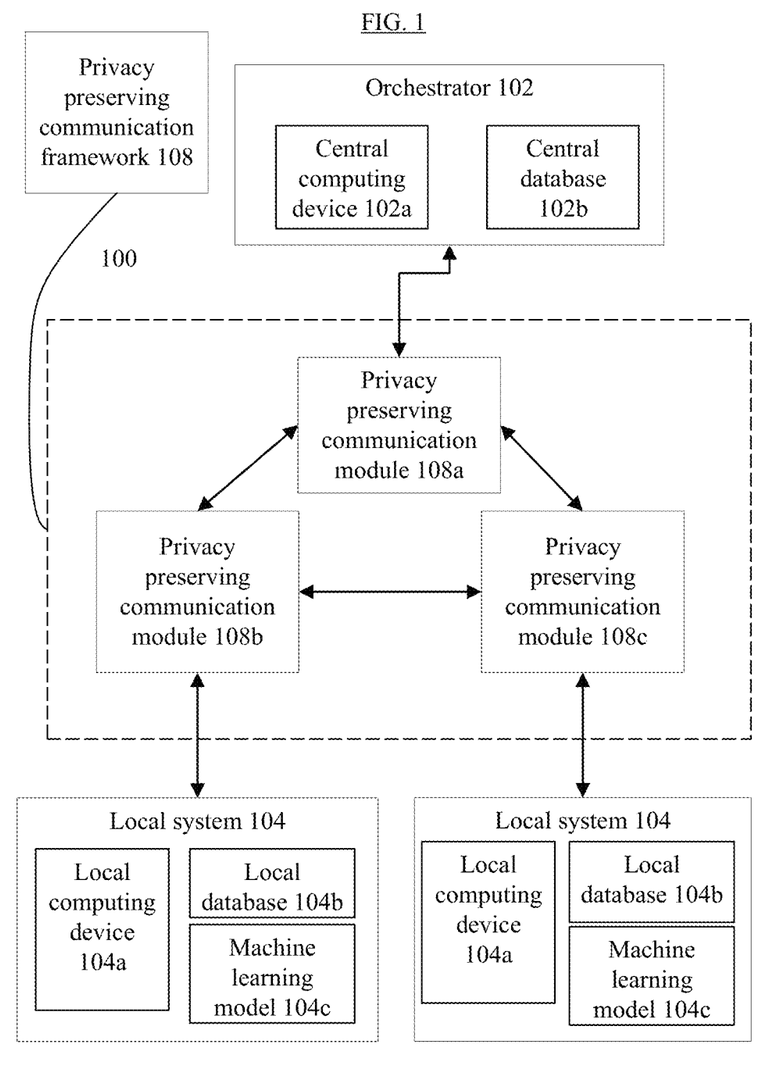
FIG. 1 illustrates an exemplary system for performing a decentralized audit using a privacy preserving framework.

FIG. 1 depicts an illustrative system 100 for performing a decentralized privacy preserving audit in accordance with examples provided herein. As shown, in some examples, the system 100 may include an orchestrator 102, one or more local systems 104, and a privacy preserving communication framework 108. In some examples, the one or more local systems 104 are communicatively coupled (e.g., by one or more wired or wireless network communication protocols and/or interface(s)) to the orchestrator using the privacy preserving communication framework/protocol. In some examples, the one or more local systems 104 are communicatively coupled to the orchestrator system using a communication framework other than the privacy preserving communication framework. In some examples, each of the one or more local systems are communicatively coupled to each of the other local systems. In some examples, each of the one or more local systems are communicatively coupled to each of the other local systems using the privacy preserving communication framework. In some examples, one or more of the one or more local systems is communicatively coupled to one or more of the other local systems using a communication framework other than the privacy preserving communication framework.

Whether communications from one local system to another local system (i.e., a remote system), from a local system to the orchestrator system, or from the orchestrator system to one or more local systems are routed through the privacy preserving communication framework or transmitted by traditional communication frameworks may depend on the type of communication and/or one or more circumstances associated with the communication. For instance, in some situations, the communications among different audit teams for different audit clients within the same audit firm may not have to go through the privacy preserving communication framework. On the other hand, the communications between business entities within a supply chain for supply chain collaborations might have to go through a privacy preserving communication framework so that the identities of the suppliers as well as the actual transactions between business entities are protected.

In some examples, the orchestrator 102 may include any computerized system configured to communicate through a privacy preserving communication framework with one or more of the plurality of local systems to perform a local audit. The orchestrator 102 may include one or more processors, such as central computing device 102a. The orchestrator 102 may further include any suitable computer storage medium, such as central database 102b, configured to store data, for example, data related to one or more local audits, including but not limited to audit strategies, audit assertions, and audit reports.

In some examples, the plurality of local systems 104 may each include any computerized system configured to communicate with the orchestrator system and one or more of the other local systems through the privacy preserving framework 108. As shown, each local system 104 may include a respective set of one or more processors, such as local computing device 104a. The local computing device 104a may be configured to execute instructions (e.g., audit assertions) received from the orchestrator 102. The local computing device 104a may further be configured to store results from each local audit model epoch and/or each round of training one or more machine learning models 104c in the local system, as described below. Additionally, each local system 104 may include a respective computer storage medium, such as local database 106b configured to store local data including, for example, data usable for performing a local audit and for training one or machine learning models used for performing a local audit.

In FIG. 1, detailed components of two exemplary local systems 104 are shown, though it should be understood that any one or more of the plurality of local systems 104 may include the same or similar corresponding components. The local systems 104 can be distributed across multiple geographic locations, multiple different organizations, and/or multiple departments within the same organization. The local systems 104 may be located geographically proximate to one another (including, even, by being provided as a part of the same computer system) while being communicatively demarcated from one another (e.g., such that they cannot communicate directly with one another).

In some examples, the plurality of local systems 104 may include one or more trained machine learning models 106c. The one or more trained machine learning models may include one or more of supervised machine learning models, unsupervised machine learning models, and semi-supervised machine learning models. The one or more trained machine learning models may be trained and tested at the local system level (e.g., the training and testing may be decentralized). The one or more trained machine learning models may be used to augment or perform a local audit.

In some examples, the plurality of local systems 104 be configured to provide one or more interfaces, the interfaces being configured to allow one or more auditors to input rules for performing an audit. The one or more auditors may be incentivized to input rules for performing an audit into the system using a decentralized incentive settlement protocol. For instance, the system may be configured to distribute a token to the one or more auditors when a rule input by the respective auditor is used to perform the local audit.

In some examples, the decentralized incentive settlement protocol may be a decentralized protocol that provides an accounting, financial reporting, audit, and analysis virtual machine (e.g., Audit Chain). As the virtual machine is populated with more logical rules, processes associated with accounting, auditing, financial reporting, and financial analysis may become more automated.

In some decentralized incentive settlement protocols, for instance, Audit Chain, contributors (e.g., accountants, auditors) may create Process Control non-fungible tokens (NFTs), which are "immutable, transferrable digital representation of a control that automates an accounting, financial reporting, audit or analysis process." *Process Control NFTs*, AUDITCHAIN (last visited Jan. 3, 2023) https://docs.auditchain-.finance/auditchain-protocol/auditchain-core-v1/process-control-nft. A Process Control NFT may use the ERC721 standard on the Ethereum or Polygon blockchain, or other Ethereum Virtual Machine (EVM) chain. Contributors may be incentivized to contribute by distributing a reward to the contributor (e.g., an AUDT Token for a system implementing the Audit Chain protocol) when a Process Control NFT created by the contributor is used.

In some examples, the privacy preserving communication framework 108 comprises one or more zero-knowledge proof protocols. Zero-knowledge proof is a cryptographic method by which one party, called "the prover," can prove to another party, "the verifier," that certain statements are true without revealing any other information.

In some examples, the one or more zero-knowledge proof protocols may be interactive zero-knowledge proof protocols and in some examples the one or more zero-knowledge proof protocols may be non-interactive. An interactive zero-knowledge proof protocol is a protocol which may include repeated interactions between the prover and the verifier wherein the prover is "challenged" by the verifier to repeatedly demonstrate its knowledge of a fact. The process may be repeated until the verifier is confident that the prover is honest. A non-interactive zero-knowledge proof protocol is a protocol which may include generating, by a trusted dealer, a reference string, and after the reference string is generated, the proof consists of a single message from the prover to the verifier. See André Chailloux, et al. Interactive and Noninteractive Zero Knowledge are Equivalent in the Help Model, CRYPTOLOGY EPRINT ARCHIVE, Dec. 13, 2007, chrome-extension://efaidnbmnnnibpcajpcglclefindmkaj/https://eprint.iacr.org/2007/467.pdf.

A demonstration of zero knowledge must meet the following requirements. First, a demonstration of zero knowledge proof must be complete and/or irrefutable. See *Zero-Knowledge Proofs*, ETHEREUM.ORG (last updated Dec. 22, 2022) https://ethereum.org/en/zero-knowledge-proofs/. For example, if a claim is genuine, an honest prover will be persuaded of its genuineness by an equally honest verifier. See id. Second, a demonstration of zero knowledge proof must satisfy a soundness requirement. Id. For example, if a claim is not genuine, there is miniscule chance that a dishonest prover can persuade an honest verifier that it is genuine. See id. In other words, "if the input is invalid, it is theoretically impossible to fool the zero-knowledge protocol to return 'true.'" Id. Third, a demonstration of zero-knowledge proof must satisfy a requirement of zero-knowledge. Id. For example, if a claim is genuine, then a requirement of zero-knowledge may be satisfied if the verifier can verify only that the claim is genuine (i.e., the verifier is not privy to any additional information about the claim). See id. In a protocol satisfying the zero-knowledge requirement, "the verifier learns nothing about a statement beyond its validity or falsity." Id.

In some examples, the one or more zero-knowledge proof protocols may include one or more of the following existing protocols: Zero-Knowledge Succinct Non-Interactive Argument of Knowledge (zk-SNARK) protocols, Zero-Knowledge Scalable Transparent Arguments of Knowledge (zk-STARK) protocols, and zkLedger. In some examples, the privacy preserving communication framework may inherit one or more characteristics of the one or more zero-knowledge proof protocols. For example, the zk-SNARK and zk-STARK protocols may vary with respect to set-up requirements, scalability, and resistance to attacks from quantum computers. With respect to set-up requirements, the zk-STARK protocols leverage publicly verifiable randomness to build trustworthy verifiable computing systems. Jagjit Singh, *zk-STARKs vs. zk-SNARKs Explained*, COINTELEGRAPH (Jul. 25, 2022) https://cointelegraph.com/explained/zk-starks-vs-zk-snarks-explained. In contrast, the zk-SNARK protocols require a trusted setup phase. See id. Further, zk-STARK protocols may be more scalable with respect to computational speed and size, and more resistant to attacks by quantum computers than zk-SNARK protocols. See id. An alternative to the zk-SNARK or zk-STARK protocols is zkLedger, which uses a non-interactive zero-knowledge proof protocol. *What is zkLedger*, BIT2ME ACADEMY (last updated Dec. 21, 2022) https://academy.bit2me.com/en/que-es-zkledger/.

The zk-Ledger protocol differs from zk-SNARK and zk-STARK protocols in that it is a Schnorr type cryptographic proof scheme. See id. The zk-Ledger protocol does not require a reliable configuration and relies on widely used cryptographic assumptions to build trustworthy verifiable computing systems. See id. These cryptographic assumptions often involve simpler programming and may thus provide advantages from an implementation and maintenance perspective. See id.

In some examples, any one or more of the above protocols, or any other privacy preserving communication protocol, may be incorporated into the systems and methods described herein. For instance, privacy preserving communication framework 108 may comprise a k-anonymity privacy preserving protocol or a differential privacy protocol. It should be understood that the aforementioned privacy preserving communication protocols are meant to be exemplary, and other privacy preserving communication frameworks/protocols may be implemented in accordance with the examples provided herein. These exemplary privacy preserving communication protocols provide a mechanism for verifying the genuineness (e.g., accuracy, truthfulness, existence) of financial records, accounting records, or other records without compromising privacy (e.g., confidentiality, secrecy).

The privacy preserving communication framework may, in some examples, include a plurality of privacy preserving communication modules 108*a*, 108*b*, and 108*c*, wherein a privacy preserving communication module communicatively couples one or more of the local systems in the plurality of local systems 104 to the orchestrator system 102 and, in some examples, to one or more of the other local systems. In some examples, a local system of the plurality of local systems may be communicatively coupled to one or more of the remaining local systems through a privacy preserving framework other than through the privacy preserving framework communicatively coupling the plurality of local systems to the orchestrator system. Each of the privacy preserving communication modules may comprise one or more of the privacy preserving communication protocols discussed above (e.g., zero-knowledge proof, k-anonymity, differential privacy).

In some examples, the privacy preserving communication framework 108 may comprise a ledger, wherein the ledger comprises data associated with one or more of the orchestrator system and the one or more local systems. For instance, the ledger may include financial data associated with one or more of the one or more local systems.

As such, the illustrative system 100 provided in FIG. 1 may implement an orchestrator system 102 communicatively coupled to one or more local systems 104 using a privacy preserving framework 108 to perform a local audit.

Exemplary Method for Performing a Decentralized Audit

Figure 2A:
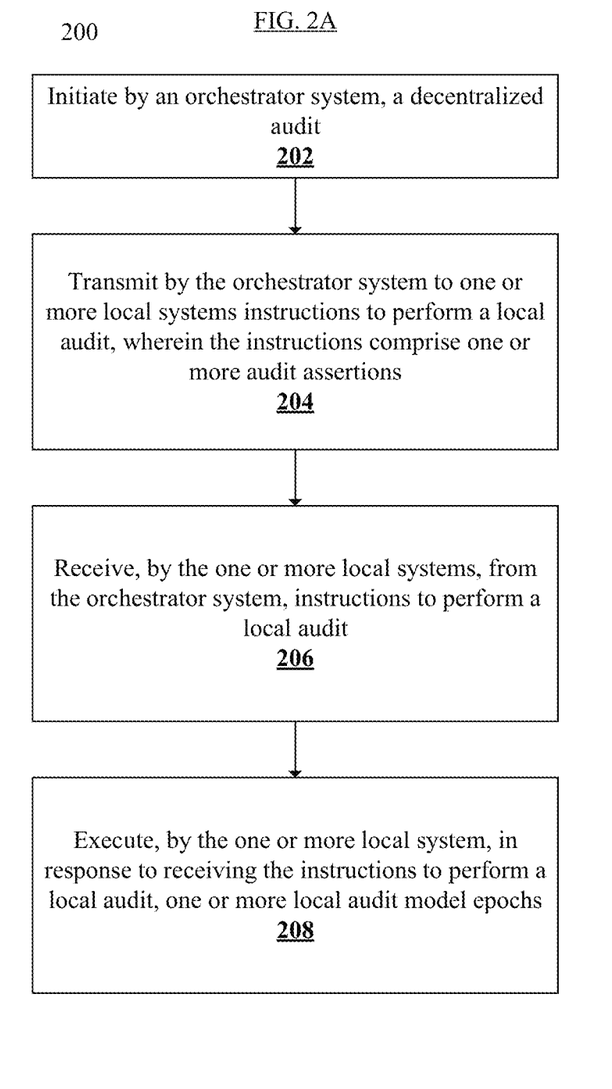
FIG. 2A illustrates an exemplary method for performing a decentralized audit.

FIG. 2A depicts an exemplary method 200 for performing a decentralized privacy preserving audit in accordance with examples provided herein. Method 200 is performed, for example, using one or more electronic devices implementing a software platform. In some examples, method 200 is performed using a system as described above with reference to FIG. 1. In method 200, some blocks are, optionally, combined, the order of some blocks is, optionally, changed, and some blocks are, optionally, omitted. In some examples, additional steps may be performed in combination with the method 200. Accordingly, the operations as illustrated (and described in greater detail below) are exemplary by nature and, as such, should not be viewed as limiting.

In some examples, the method 200 can begin at step 202, wherein an orchestrator system communicatively coupled to one or more local systems initiates a decentralized audit. The one or more local systems may be communicatively coupled to the orchestrator system and/or to the other local systems of the one or more local systems in the manner described above with respect to FIG. 1. In some examples, initiating, by the orchestrator system, the local audit, comprises developing an audit strategy to be executed in conjunction with the one or more local systems, and generating and storing data representing the audit strategy. In some embodiments, the audit strategy may indicate whether and how to perform control and substantive testing based on the inherent risk of each of the line items of the financial statement, if for instance, the audit is targeting a financial statement audit. For each line item, the audit strategy may direct further analysis of the business entities that may be subsidiaries of the audit entity, as well as business entities that might be suppliers, customers, or parties otherwise related to or engaged in transactions with the entities being audited.

An audit strategy is set up to prioritize audit resources to minimize the audit risk (the likelihood of material misrepresentation comprising the product of inherent risk, control risk, and detection risk). In some examples, and at various points during the method 200, the orchestrator system may further develop the audit process, define materiality, perform control testing, perform substantive testing, and generate an attestation of the financial statement. The orchestrator may adjust various parameters with respect to the local audit based on one or more of characteristics of the respective industry, or characteristics of a specific local system and transmit the adjusted parameters to a respective local system.

In some examples, after initiating a decentralized audit at step 202 the method 200 can proceed to step 204, wherein step 204 comprises transmitting by the orchestrator system to the one or more local systems instructions to perform a local audit, wherein the instructions are generated and transmitted in accordance with the developed audit strategy. In some examples, the instructions to perform a local audit are transmitted by the orchestrator system to a subset of the one or more local systems. As discussed above, the instructions may be transmitted using either a privacy preserving communication framework (e.g., a zero-knowledge proof protocol) or by any conventional electronic communication mechanism.

The orchestrator system may identify relevant entities (e.g., the local systems pertinent to a decentralized audit) and relationships between the entities (for instance, organizational relationships such as a supplier, customer, and third party associated with a respective account in a chart of accounts; and/or a relationship defined by communicative and/or network disposition with respect to one another, for example which entities are communicatively linked to one another and in what manner; and/or relationships defined by an extent to which information is shared or is not shared between different entities), and may inform the respective local systems from which other local systems to request information. The orchestrator system may provide varying amounts of identifying information associated with each of the respective local systems to other local systems (including instances where the central orchestrator provides each respective local system with no identifying information associated with other local systems, limited identifying information, or full identifying information).

The instructions to perform a local audit may comprise one or more audit assertions. The audit assertions may be items that the orchestrator system is requesting the local system to verify. For instance, the audit assertions may include requests to verify the existence, completeness, accuracy, classification, or disclosure of various data at one or more levels, wherein the one or more levels may be the line-item level, account level, audit objective level, or transaction level.

In some examples, the instructions to perform a local audit transmitted by the orchestrator system at step 204 include a time constraint, wherein the information from the one or more data sources from the local data set is limited by the time constraint. The time constraint may be a time interval with which the information from the one or more data sources from the local data set is associated. For instance, in some examples, the orchestrator system may instruct a local system to perform an audit with respect to data from a specified time frame (e.g., the last financial quarter or last 12 months).

In some examples, the orchestrator system may initiate a local audit in a plurality of local systems at the same time. The orchestrator system may communicate to the local systems instructions to perform a local audit with respect to a specified time frame. In other words, the orchestrator system may instruct the plurality of local systems to perform an audit with respect to data from the last financial quarter or year, or, to account for discrepancies in the financial year observed by different organizations, the orchestrator system may instruct each of the one or more local systems to conduct an audit with respect to data from the last 3 months (or any other specified time frame).

In some examples, after transmitting by the orchestrator system to the one or more local systems instructions to perform a local audit at step 204, the method can proceed to step 206, wherein step 206 comprises receiving, by the one or more local systems, from the orchestrator system, instructions to perform a local audit. After receiving, by the one or more local systems instructions to perform a local audit, the method 200 can proceed to step 208, wherein step 208 comprises executing by the one or more local systems, in response to receiving instructions to perform a local audit, one or more local audit epochs.

In some examples, executing, by the one or more local systems, in response to receiving the instructions to perform a local audit, one or more local audit model epochs includes performing one or more auditing methods including tie-out, roll forward, vouching, tracing, and/or reconciliation with either limited or full visibility to the underlying data. In some examples, information is needed from one or more remote systems (e.g., one or more different local systems) to perform tie-out, roll forward, vouching, tracing, and/or reconciliation. If information is needed from one or more remote systems, the information may be provided with full access and thus full visibility, or with limited access and thus limited visibility.

In some examples, if the information needed to complete tie-out, roll forward, vouching, tracing, and/or reconciliation is provided to a respective local system with limited access/limited visibility, the information may be transmitted to the respective local system using a privacy preserving communication framework, for instance as described with respect FIG. 1. For example, vouching and tracing may include performing validation of transaction data against documents available locally (and hence always with full visibility), or remotely (with the audited entity granting access and hence with full visibility), or remotely (with the audited entity granting limited access and hence with limited visibility). Limited access may require imposing a privacy preserving communication framework/protocol for sharing the information. This process of requesting information from remote systems is described in further detail below with regard to a local audit model epoch performed as part of a decentralized audit.

Exemplary Method for Executing One or More Local Audit Model Epochs

Figure 2B:
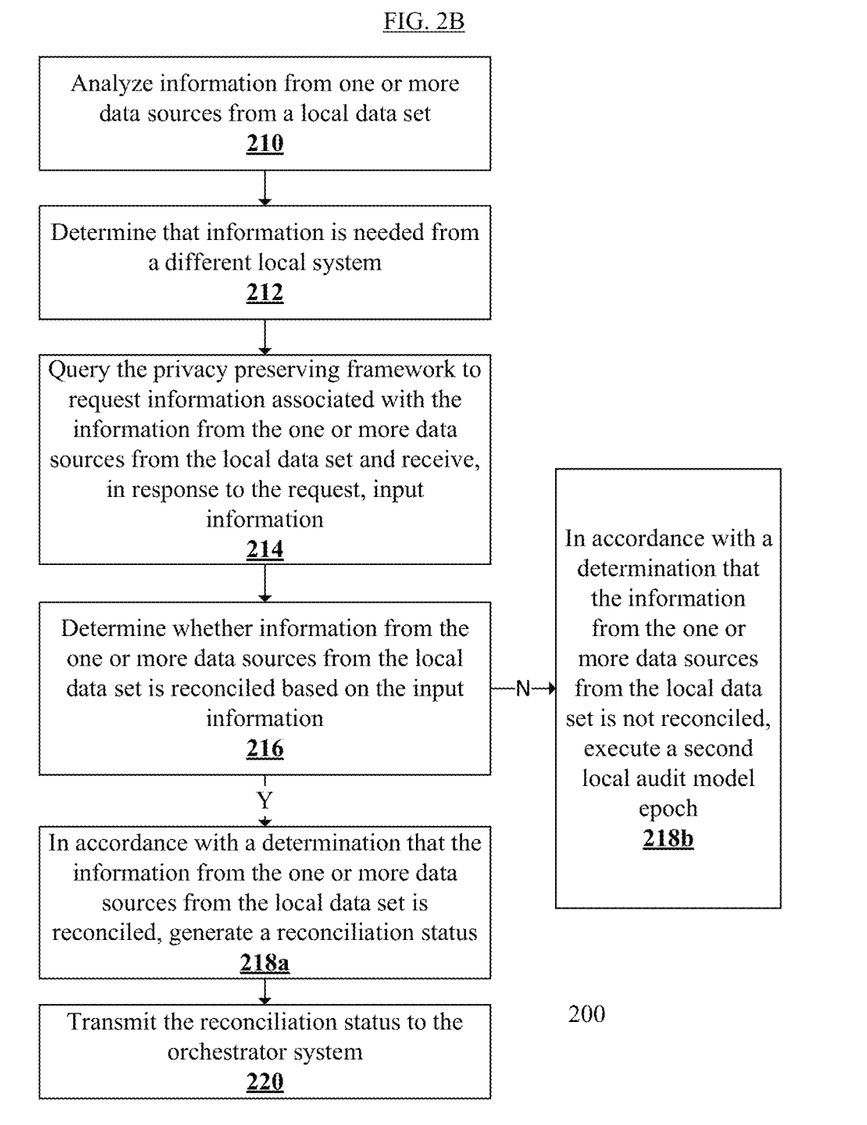
FIG. 2B illustrates an exemplary method for executing one or more local audit model epochs.

FIG. 2B illustrates an exemplary local audit model epoch where information is provided by a remote system through a privacy preserving framework. In some examples, the continuation of the method 200 depicted in FIG. 2B can begin at step 210, where step 210 comprises analyzing, by a respective local system of the one or more local systems, information from one or more data sources from a local data set (e.g., by performing tie-out, roll forward, vouching, tracing, and/or reconciliation). In some examples, after analyzing the information from one or more data sources from a local data set at step 210, the method 200 can proceed to step 212, wherein step 212 comprises determining that information is needed from a different local system.

After determining that information is needed from a different local system at step 212, the method 200 can proceed to step 214, wherein step 214 comprises querying the privacy preserving framework to request information associated with the information from the one or more data sources from the local data set and receiving, in response to the request, input information. Different local systems can communicate with others at different levels of privacy preservation (e.g., some metadata shared, no metadata shared). The level of identifying information/metadata shared between local systems may be determined by the orchestrator system and communicated from the orchestrator system to the local systems (e.g., in the instructions to perform a local audit).

In some examples the input information from the privacy preserving framework comprises data and a confidence value associated with the data. In some examples, the privacy preserving framework comprises one or more of a zero-knowledge protocol, a k-anonymity protocol, and a differential privacy protocol, as described above with respect to FIG. 1. In some examples, the privacy preserving framework comprises a ledger, the ledger comprising data associated with one or more of the orchestrator system and the one or more local systems. The aforementioned privacy preserving communication protocols are meant to be exemplary, and other privacy preserving communication protocols may be implemented in accordance with the examples provided herein.

In some examples, after querying the privacy preserving framework to request information associated with the information from the one or more data sources from the local data set and receiving, in response to the request, input information at step 214, the method 200 can proceed to step 216, wherein step 216 comprises determining whether information from the one or more data sources from the local data set is reconciled based on the input information. In some examples, determining whether information from the one or more data sources from the local data set is reconciled based on the input information at step 216 comprises comparing the information from the one or more data sources from the local data set to the input information received through the privacy preserving framework to determine the validity and/or accuracy of the information from the one or more data sources from the local data set.

In some examples, after determining whether information from the one or more data sources from the local data set is reconciled based on the input information at step 216, the method 200 can proceed to step 218a, wherein step 218a comprises, in accordance with determining that the information from the one or more data sources from the local data set is reconciled, generating a reconciliation status, wherein the reconciliation status indicates that the information from the one or more data sources from the local data set is reconciled. In some examples, in accordance with a determination that the information from the one or more data sources from the local data set is not reconciled at step 216, the method 200 may proceed to step 218b, wherein step 218b comprises executing, by the local system, a second local audit model epoch. In some examples, upon a determination that the information from the one or more data sources from the local data set is not reconciled at step 216, the local system may transmit to the orchestrator system an indication that the local audit epoch is not reconciled, and upon receiving the indication that the local audit epoch is not reconciled, the orchestrator system may transmit to the local system instructions to advance to the next local audit model epoch.

In some examples, the second local audit model epoch, and each subsequent local audit model epoch includes progressively requesting additional information through the privacy preserving framework (e.g., additional information related to the same or a different transaction, line item, etc.). Consecutive local audit model epochs may be executed until either the local system determines that the information from the one or more data sources from the local data set is reconciled, or until further information cannot be transmitted without compromising the privacy of the transmitting entity.

In some examples, after generating a reconciliation status, wherein the reconciliation status indicates that the information from the one or more data sources from the local data set is reconciled, at step 218a, the method 200 may proceed to step 220, wherein step 220 comprises transmitting the reconciliation status to the orchestrator system.

Figure 3:
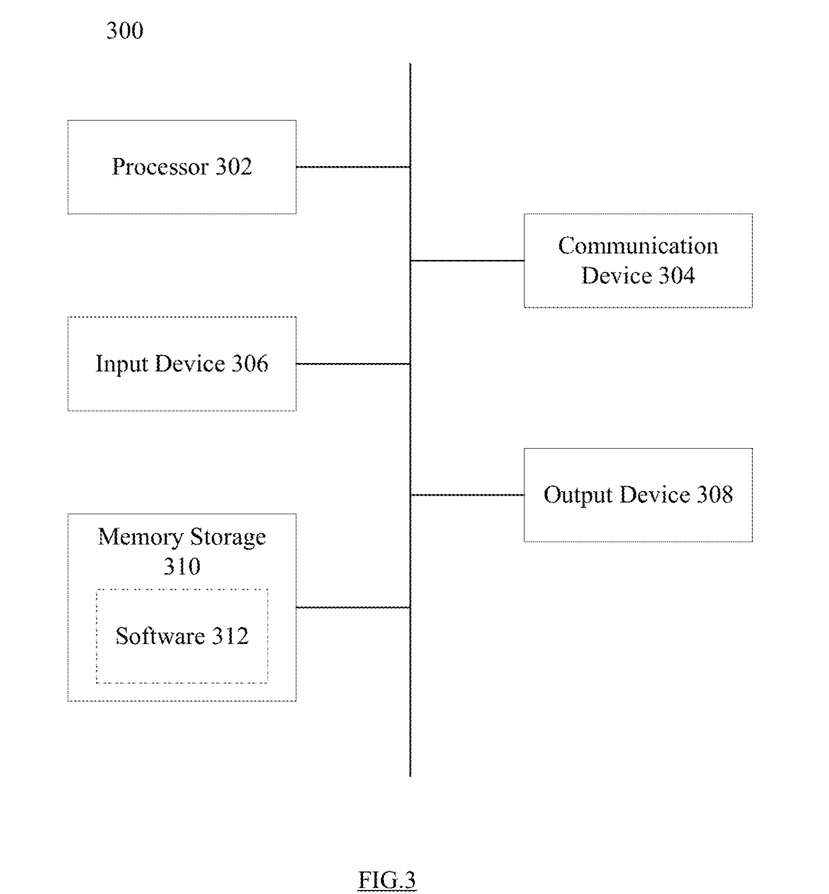
FIG. 3 illustrates an exemplary electronic device, in accordance with some examples.

FIG. 3 depicts an exemplary computing device 300, in accordance with one or more examples of the disclosure. Device 300 can be a host computer connected to a network. Device 300 can be a client computer or a server. As shown in FIG. 3, device 300 can be any suitable type of microprocessor-based device, such as a personal computer, workstation, server, or handheld computing device (portable electronic device) such as a phone or tablet. The device can include, for example, one or more of processors 302, input device 306, output device 308, storage 310, and communication device 304. Input device 306 and output device 308 can generally correspond to those described above and can either be connectable or integrated with the computer.

Input device 306 can be any suitable device that provides input, such as a touch screen, keyboard or keypad, mouse, or voice-recognition device. Output device 308 can be any suitable device that provides output, such as a touch screen, haptics device, or speaker.

Storage 310 can be any suitable device that provides storage, such as an electrical, magnetic, or optical memory, including a RAM, cache, hard drive, or removable storage disk. Communication device 304 can include any suitable device capable of transmitting and receiving signals over a network, such as a network interface chip or device. The components of the computer can be connected in any suitable manner, such as via a physical bus or wirelessly.

Software 312, which can be stored in storage 310 and executed by processor 302, can include, for example, the programming that embodies the functionality of the present disclosure (e.g., as embodied in the devices as described above).

Software 312 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 310, that can contain or store programming for use by or in connection with an instruction execution system, apparatus, or device.

Software 312 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 300 can implement any operating system suitable for operating on the network. Software 312 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for performing a decentralized privacy preserving audit comprising:
   a first local system communicatively coupled to an orchestrator system;
   one or more processors; and
   a memory storing one or more programs, the one or more programs configured to be executed by the one or more processors and including instructions that when executed by the one or more processors cause the system to:
   receive by the first local system, from the orchestrator system, instructions to perform a local audit;
   execute, by the first local system, in response to receiving the instructions to perform the local audit, a first local audit model epoch, wherein executing the first local audit model epoch comprises:
   analyzing information from one or more data sources from a local data set;
   receiving first input information from a second local system through a privacy preserving communication framework in response to requesting the first input information;
   determining whether information from the one or more data sources from the local data set is reconciled based on the first input information; and
   in accordance with a determination that the information from the one or more data sources from the local data set is not reconciled, executing a second local audit model epoch, wherein executing the second local audit model epoch comprises requesting second input information from the second local system through the privacy preserving communication framework.

2. The system of claim 1, wherein executing the first local audit model epoch comprises, in accordance with a determination that the information from the one or more data sources from the local data set is reconciled, generating a reconciliation status and transmitting the reconciliation status to the orchestrator system, wherein the reconciliation status indicates that the information from the one or more data sources from the local data set is reconciled.

3. The system of claim 1, wherein executing the second local audit model epoch comprises: in accordance with a determination that the second input information can be transmitted through the privacy preserving communication framework without compromising the privacy of the second local system, transmitting the second input information through the privacy preserving communication framework.

4. The system of claim 1, wherein executing the second local audit model epoch comprises: in accordance with a determination that the second input information cannot be transmitted through the privacy preserving communication framework without compromising the privacy of the second local system, not transmitting the second input information through the privacy preserving communication framework.

5. The system of claim 2, wherein the orchestrator system is configured to, upon receiving the transmitted reconciliation status, generate an audit report.

6. The system of claim 1, wherein the instructions to perform the local audit include identifying information associated with the first local system and second local system.

7. The system of claim 1, wherein the instructions to perform the local audit instruct the first local system to share metadata with the second local system.

8. The system of claim 1, wherein the instructions to perform the local audit comprise one or more audit assertions provided by the orchestrator system.

9. The system of claim 1, wherein the first local system and second local system are communicatively coupled to the orchestrator system using the privacy preserving communication framework.

10. The system of claim 1, wherein the first local system and second local system form a subset of a plurality of local systems and wherein each of the plurality of local systems are communicatively coupled to each of the other local systems in the plurality of local systems.

11. The system of claim 10, wherein each of the plurality of local systems are communicatively coupled to the orchestrator system using the privacy preserving communication framework.

12. The system of claim 10, wherein each of the plurality of local systems are communicatively coupled to each of the other local systems in the plurality of local systems using the privacy preserving communication framework.

13. The system of claim 1, wherein the privacy preserving communication framework comprises a ledger.

14. The system of claim 1, wherein the privacy preserving communication framework comprises one or more zero-knowledge proof protocols.

15. The system of claim 14, wherein one or more of the one or more zero-knowledge proof protocols is an interactive zero-knowledge proof protocol.

16. The system of claim 14, wherein one or more of the one or more zero-knowledge proof protocols is a non-interactive zero-knowledge proof protocol.

17. The system of claim 1, wherein the privacy preserving communication framework comprises a plurality of privacy preserving communication modules, wherein a privacy preserving communication module communicatively couples the first local system to the orchestrator system.

18. The system of claim 1, wherein the instructions to perform the local audit comprise a time constraint, and wherein the information from the one or more data sources from the local data set is limited by the time constraint.

19. The system of claim 18, wherein the time constraint comprises a time interval.

20. The system of claim 1, wherein the first local system comprises one or more trained machine learning models.

21. The system of claim 1, wherein the first local system comprises one or more interfaces, the one or more interfaces being configured to allow one or more auditors to input rules for performing the local audit.

22. The system of claim 21, wherein executing a local audit model epoch further comprises: distributing a token to one or the one or more auditors when a rule input by the respective auditor is used to perform the local audit.

23. The system of claim 1, wherein executing the first local audit model epoch further comprises: generating by the first local system, an audit report.

24. A method comprising:
receiving by a first local system, from an orchestrator system, instructions to perform a local audit;
executing, by the first local system, in response to receiving the instructions to perform the local audit, a first local audit model epoch, wherein executing the first local audit model epoch comprises:
analyzing information from one or more data sources from a local data set; receiving first input information from a second local system through a privacy preserving communication framework in response to requesting the first input information;
determining whether information from the one or more data sources from the local data set is reconciled based on the first input information; and
in accordance with a determination that the information from the one or more data sources from the local data set is not reconciled, executing a second local audit model epoch, wherein executing the second local audit model epoch comprises requesting second input information from the second local system through the privacy preserving communication framework.

25. The method of claim 24, wherein executing the first local audit model epoch further comprises: in accordance with a determination that the information from the one or more data sources from the local data set is reconciled, generating a reconciliation status and transmitting the reconciliation status to the orchestrator system, wherein the reconciliation status indicates that the information from the one or more data sources from the local data set is reconciled.

26. A non-transitory computer readable storage medium storing one or more programs, the one or more programs comprising instructions, which when executed by one or more processors of an electronic device, cause the electronic device to:
receive by a first local system, from an orchestrator system, instructions to perform a local audit;
execute, by the first local system, in response to receiving the instructions to perform the local audit, a first local audit model epoch, wherein executing the first local audit model epoch comprises:
analyzing information from one or more data sources from a local data set;
receiving first input information from a second local system through a privacy preserving communication framework in response to requesting the first input information;
determining whether information from the one or more data sources from the local data set is reconciled based on the first input information; and
in accordance with a determination that the information from the one or more data sources from the local data set is not reconciled, executing a second local audit model epoch, wherein executing the second local audit model epoch comprises requesting second input information from the second local system through the privacy preserving communication framework.

27. The non-transitory computer readable storage medium of claim 26, wherein executing the first local audit model epoch further comprises: in accordance with a determination that the information from the one or more data sources from the local data set is reconciled, generating a reconciliation status and transmitting the reconciliation status to the orchestrator system, wherein the reconciliation status indicates that the information from the one or more data sources from the local data set is reconciled.

* * * * *